May 21, 1935.  L. KIMBRIG  2,001,964
FURNITURE SPRING
Filed April 30, 1934
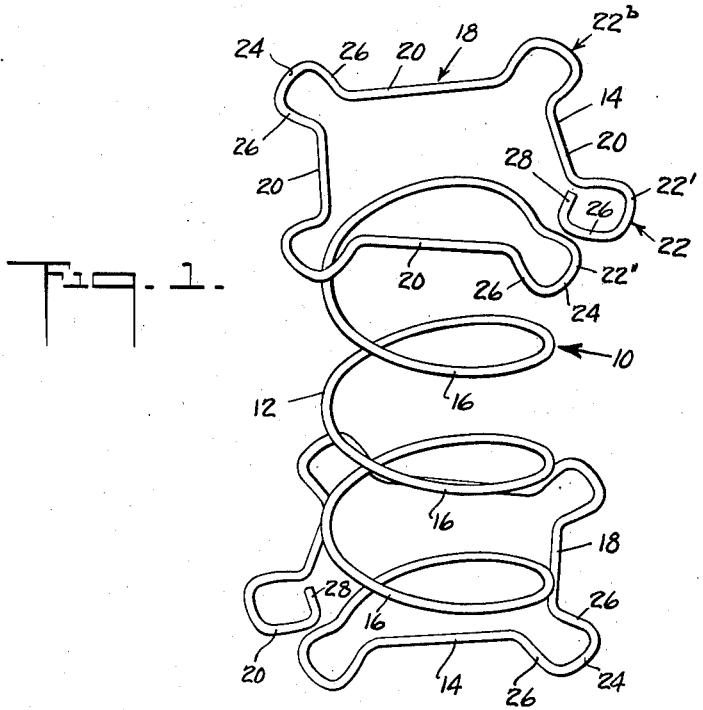
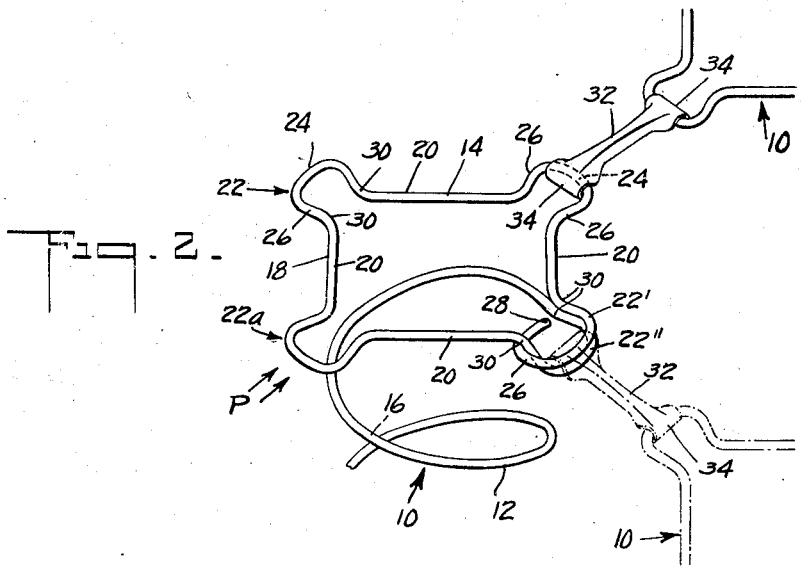
INVENTOR
LOUIS KIMBRIG.
BY
William R. Liberman
ATTORNEY Patented May 21, 1935

2,001,964

UNITED STATES PATENT OFFICE 2,001,964

FURNITURE SPRING

Louis Kimbrig, Brooklyn, N. Y.

Application April 30, 1934, Serial No. 723,122

2 Claims. (Cl. 5—256)

My invention relates to spiral springs of the cylindrical and helical type, and particularly to such springs with closed outermost or end convolutions.

Spiral springs are designed for utilization generally by compression or extension along a line parallel to their axes, and are very largely employed in articles of furniture such as bed springs, mattresses, cushion and spring seats and the like though use thereof is made in many other fields. Springs of this type, while same may, are very seldom used singly, but several thereof are generally tied, linked or otherwise secured together into a complete assembly. The springs are tied and linked together at their extremities, i. e., the outermost or end convolutions, and when secured in place in and as a part of an article of furniture, same are likewise secured or attached by their extremities, i. e., their outermost or end convolutions. These, therefore, have some measure of support and reinforcement.

It is of paramount importance, however, that the inner coils of these springs—which do not have this support—retain their predetermined size and shape, in order that they may function perfectly to absorb and dissipate the stresses and strains imparted thereto.

In such connection, it is essential that the outermost or end convolutions which directly receive the impacts of the applied forces be of such character as to absorb at least a portion of such forces. Any twisting or distortion of the outermost or end convolution is directly transmitted and communicated to the inner coils, to the destruction of the latter's efficient operation, and to have a spring of any useful life, provision must be made to insure the stability of the end convolutions so far as their size and shape is concerned without affecting its resilient character.

It is an object, therefore, of my invention to provide a spring of the character described with an outermost or end convolution which will not slip, loosen, or otherwise change its size and shape during usage.

In connection with the uses to which springs of this type are often put, forces are sometimes applied thereto not along a line parallel to their axes, and it is important that these "angular" forces be partly absorbed and dissipated before same are passed along to the inner coils of the spring, in order that they do not act upon and distort said inner coils.

It is a further object, therefore, of my invention to provide a spring of the character described with an outermost or end convolution which will absorb at least part of the forces applied thereto along a plane or line not parallel to the axis of the spring.

Further objects of my invention will be obvious from the following description of one embodiment thereof, and in part be pointed out hereinbelow.

In the drawing annexed hereto and made a part hereof:

Figure 1 is a perspective of one form of device constructed according to and embodying my said invention; the outermost or end convolutions being open, in position to be locked and closed; and Fig. 2 is a view similar to Fig. 1 of a portion of a similar form of device but with the outermost or end convolution closed and locked. In this figure, I also illustrate the manner in which I link together several spring units to form a complete spring assembly.

In the drawing, reference numeral 10 designates the spring generally, comprising body portion 12 and end portion 14 integral therewith. Body 12 is formed into a number of substantially circular spiral coils 16, and end 14 is formed into the outermost or end convolution 18. I have illustrated my invention as applied to a spiral spring of the cylindrical type, but same is not limited thereto, and may be applied to springs of the helical or other types.

End 14 is integral with and an extension from body 12 of spring 10, which, as a unit, is formed of a single length of wire.

In accordance with my invention, the outermost or end convolution (which outermost or end convolution I shall hereinafter refer to as a "loop") is formed into a completely closed plane geometric figure. In the drawing, I have illustrated my invention as applied to an outermost or end loop 18 of substantially square shape, since this is my preferred embodiment. My invention, however, is also applicable to a triangular outermost or end loop, and to a five sided or pentagonal outermost or end loop, etc.

In discussing the shape of the outermost or end loop I use the word "substantially" because while the sides of the figure are shown to be straight, same need not be, but may be curved slightly; and further because the junctions or meeting points of the component straight sides 20 of loop 18 are bowed outwardly from said sides 20 to form open loops or U-bends 22 at the corners of the figure, which open loops or U-bends (as they will interchangeably be referred to) are composed of trough or stirrup portions 24 and side wall portions 26. Each of these loops or U-bends is identical in size and shape with every other loop or bend. Troughs 24 are equal in length to side walls 26, and while these are shown to be about half as long as the sides 20 of the loop 18, same may be—at the minimum—a fourth or even an eighth as large as said sides, and—at the maximum—equal thereto in length.

If it is desired, as shown, to provide an outermost or end loop of square shape, at least five open loops or U-bends must be provided in the end portion of the spring, since, in accordance with my invention, to close the loop, the last or endmost of the U-bends is superposed upon the first U-bend, i. e., the U-bend most adjacent the body portion of the spring, and secured in such aligned superposition. With a three-sided outermost or end loop, four open loops or U-bends must be provided; with a five-sided outermost or end loop, six open loops or U-bends must be provided. In every case, there must be one loop more than the number of sides desired, and in each instance, the endmost thereof overlaps the first thereof and is secured thereto to close the outermost or end convolution of the spring.

In Fig. 1, I show the endmost U-bend 22' spaced apart, or sprung apart, from the first U-bend 22''; in Fig. 2, I show U-bend 22' in place on top of and over loop 22'' and aligned therewith, and locked in such overlapping and abutting position by means of ear or lug 28 extending from the outer side wall of loop 22'.

It is by means of this overlapping of the U-bends and the securing and locking of same in such overlapping position that I close the outermost or end loop, and in this manner attain the perfection desired in the shape of said loop, and in the constancy of its size. I am familiar with spiral springs of the cylindrical or helical type in which the outermost or end convolutions are closed, but with none of the expedients heretofore adopted are the advantages I secure attainable.

When forces are applied to spring 10 (Fig. 2) along a line parallel to its axis, coil 18 is first effected, and transmits the pressure directly to coils 16; upon release of the pressure the coils will expand and the spring will resume its normal position. In a spring with an open end convolution, this normal operation does not take place except when the pressure applied to the spring is centralized thereover and applied exactly in the axial plane. For example, if loop 18 were open, as in the position of Fig. 1, and pressure were applied thereto at U-bend 22ᵇ along a line parallel to the axis of the spring, the result would be a distortion of loop 18 and a delayed transmission of the pressure to the coils, since the open end convolution would yield to the pressure to an extent to which a closed end loop could not yield.

When angular forces are applied to spring 10, and are directed to loop 18, a double spring effect is obtained which relieves coils 16 of the strains which otherwise would be imposed thereupon with disastrous results. The inner coils are not adapted to absorb angularly directed forces, and if subjected thereto quickly become distorted and useless.

Thus, if angular pressure is applied to spring 10, as in Fig. 1, with the outermost convolution open, the distortion of said convolution would be directly transmitted to the inner coils and twist them out of their true circular shape. In Fig. 2, the outermost or end loop is closed, in accordance with my invention, and when pressure, as P, is applied thereto along the line of the arrows, the shape of loop 18 changes from square to diamond; loop 18 flexing at the midpoints of troughs 24 of the U-bends or open loops on each side of bend 22ᵃ, and then, simultaneously and concurrently therewith, at points 30 where sides 26 of said U-bends on each side of bend 22ᵃ merge with and blend into loop sides 20.

This double spring effect relieves coils 16 of the burden, or at least of part thereof, of absorbing these angularly applied forces P. If loop 18 were open, as in Fig. 1, the U-bends would not accomplish this double yielding action, and said loop 18 would merely be twisted somewhat out of shape. The combination of closed loop 18 with U-bends or open loops at the corners is essential to the desired operation of said outermost or end loop, and insures its return to normal size and shape upon release or relaxation of the angularly applied pressure.

In Fig. 2, I illustrate the manner in which a number of springs are assembled. Links 32 are provided with hooks 34 at the ends thereof. These hooks 34 fit over and completely close around trough portions 34 of the U-bends of adjacent springs 10. The links may be of any desired length; shorter or longer as more or less spring units are desired to be incorporated into any given spring assembly. The U-shape of the open loops or bends, and the sides thereof, will effectively prevent the links from slipping, and the consequent displacement of the spring units relative to each other.

Having now described my invention, what I claim and desire to secure by Letters Patent is:

1. In a device of the character described, a closed outermost or end convolution comprising a length of wire in which is formed a number of U-bends, the endmost of which is disposed coincidentally on top of and in overlying relation to the first U-bend, and means integral with said endmost bend extending underneath the first U-bend for securing said endmost bend to the first thereof in the above-described relation.

2. In a device of the character described, a length of wire or similar material formed into a closed loop or coil, of substantially plane polygonal shape, having substantially straight sides to the number "$x$", and U-bends constituting the angles or meeting points of the sides, and a U-bend at the beginning and a U-bend at the end of said length of wire, all of said U-bends totalling the number "$x$ plus one", the endmost or last of which U-bends is disposed coincidentally with and on top of the first of said U-bends, and means comprising a lug extending from the tip end of said last or endmost U-bend disposed to pass underneath said first U-bend and secure same to the last U-bend in the above-described relation.

LOUIS KIMBRIG.